United States Patent
Su

(10) Patent No.: US 7,143,347 B2
(45) Date of Patent: Nov. 28, 2006

(54) METHOD AND APPARATUS FOR REFORMATTING OF CONTENT FOR DISPLAY ON INTERACTIVE TELEVISION

(75) Inventor: Dongmin Su, Santa Clara, CA (US)

(73) Assignee: OpenTV, Inc., San Francisco, CA (US)

( * ) Notice: Subject to any disclaimer, the term of this patent is extended or adjusted under 35 U.S.C. 154(b) by 645 days.

(21) Appl. No.: 10/061,903

(22) Filed: Feb. 1, 2002

(65) Prior Publication Data

US 2002/0199190 A1    Dec. 26, 2002

Related U.S. Application Data

(60) Provisional application No. 60/265,986, filed on Feb. 2, 2001, provisional application No. 60/266,210, filed on Feb. 2, 2001, provisional application No. 60/267,876, filed on Feb. 9, 2001, provisional application No. 60/269,261, filed on Feb. 15, 2001, provisional application No. 60/279,543, filed on Mar. 28, 2001.

(51) Int. Cl.
*G06F 17/00* (2006.01)

(52) U.S. Cl. ............... 715/520; 715/517; 715/530

(58) Field of Classification Search ........... 715/530, 715/517, 518, 520, 521
See application file for complete search history.

(56) References Cited

U.S. PATENT DOCUMENTS

| | | | |
|---|---|---|---|
| 5,432,937 A | 7/1995 | Tevanian et al. | |
| 5,668,810 A | 9/1997 | Cannella, Jr. | |
| 5,701,500 A * | 12/1997 | Ikeo et al. | 715/517 |
| 5,848,070 A | 12/1998 | Duraux et al. | |
| 5,987,518 A | 11/1999 | Gotwald | |
| 6,141,793 A | 10/2000 | Bryant et al. | |
| 6,188,401 B1 | 2/2001 | Peyer | |
| 6,192,082 B1 | 2/2001 | Moriarty et al. | |
| 6,201,538 B1 | 3/2001 | Wugofski | |
| 6,226,642 B1 | 5/2001 | Beranek et al. | |
| 6,311,197 B1 | 10/2001 | Mighdoll et al. | |
| 6,405,367 B1 | 6/2002 | Bryant et al. | |
| 6,480,860 B1 * | 11/2002 | Monday | 707/102 |
| 6,558,431 B1 | 5/2003 | Lynch et al. | |
| 6,593,944 B1 | 7/2003 | Nicolas et al. | |

(Continued)

FOREIGN PATENT DOCUMENTS

EP        0 778 522        6/1997

(Continued)

OTHER PUBLICATIONS

Fraternali, Piero, et al, "Model-Driven Development of Web Applications: The AutoWeb System", ACM Transactions on Information Systems (TOIS), vol. 18, Issue 4, Oct. 2000, pp. 323-382.*

(Continued)

*Primary Examiner*—William Bashore
*Assistant Examiner*—L. Ries
(74) *Attorney, Agent, or Firm*—Meyertons Hood Kivlin Kowert & Goetzel, P.C.; Rory D. Rankin

(57) ABSTRACT

A method and apparatus for presenting a variety of content from a multitude of sources broadcast from a head end server to a client device. The broadcast content comprises HTML input from broadcast, cache, the internet or other sources is processed by a lay out engine for image positioning to avoid overlapping and shaped for appearance on a client device. The image is transferred to a client device in a client compatible code for presentation to a user on a client device.

14 Claims, 12 Drawing Sheets

U.S. PATENT DOCUMENTS

| | | | |
|---|---|---|---|
| 6,659,860 B1 | 12/2003 | Yamamoto et al. | |
| 6,778,559 B1* | 8/2004 | Hyakutake | 370/486 |
| 6,792,149 B1* | 9/2004 | Florencio | 382/233 |
| 6,826,727 B1* | 11/2004 | Mohr et al. | 715/517 |
| 2002/0116707 A1* | 8/2002 | Morris et al. | 725/37 |

FOREIGN PATENT DOCUMENTS

| | | |
|---|---|---|
| WO | WO 00/24192 | 4/2000 |
| WO | WO 01/03011 | 1/2001 |
| WO | WO 01/6784 | 1/2001 |

OTHER PUBLICATIONS

De La Beaujardiere, Jeff, et al, "The NASA Digital Earth Testbed", Proceedins of the 8th ACM International Symposium on Advances in Geographic Information Systems, Nov. 2000, pp. 47-53.*
International Search Report, PCT/US 02/02829, Jan. 2, 2002.
International Search Report, PCT/US 02/02663, Apr. 11, 2003.

* cited by examiner

METHOD AND APPARATUS FOR REFORMATTING OF CONTENT FOR DISPLAY ON INTERACTIVE TELEVISION

CROSS REFERENCE TO RELATED APPLICATIONS

This application claims priority from the USPTO provisional patent application entitled "A System for Adaptive Control of Access, Content and Scheduling For Interactive Television" filed on Feb. 2, 2001, Ser. No. 60/265,986 which is hereby incorporated herein by reference; USPTO provisional patent application entitled "A System for Adaptive Control of Access, Content and Scheduling For Interactive Television" filed on Feb. 2, 2001, Ser. No. 60/266,210 which is hereby incorporated herein by reference; USPTO provisional patent application entitled "A System for Adaptive Control of Access, Content and Scheduling For Interactive Television" filed on Feb. 9, 2001, Ser. No. 60/267,876 which is hereby incorporated herein by reference; and USPTO provisional patent application entitled "A System for Adaptive Control of Access, Content and Scheduling For Interactive Television" filed on Feb. 15, 2001, Ser. No. 60/269,261 which is hereby incorporated herein by reference; USPTO provisional patent application entitled "A System for Adaptive Control of Access, Content and Scheduling For Interactive Television" filed on Mar. 28, 2001, Ser. No. 60/279,543 which is hereby incorporated herein by reference. This application is also related to USPTO patent application entitled "A Service Gateway for Interactive Television" filed on Feb. 1, 2002.

COPYRIGHT NOTICE

A portion of the disclosure of this patent document contains material (code listings and message listings) to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2001 OpenTV, Inc.

BACKGROUND OF THE INVENTION

1. Field of the Invention

The present invention relates to the field of interactive television and specifically to the reformatting of content provided by a broadcast, Internet or cache for viewing on the interactive television display space.

2. Summary of the Related Art

Interactive television systems can be used to provide a wide variety of services to viewers. Interactive television systems are capable of delivering typical video program streams, interactive television applications, text and graphic images, web pages and other types of information. Interactive television systems are also capable of registering viewer actions or responses and can be used for such purposes as marketing, entertainment and education. Users or viewers may interact with the systems by ordering advertised products or services, competing against contestants in a game show, requesting specialized information regarding particular programs, or navigating through pages of information.

Typically, a broadcast service provider or network operator generates an interactive television signal for transmission to a viewer's television. The interactive television signal may include an interactive portion consisting of application code or control information, as well as an audio/video portion consisting of a television program or other informational displays. The broadcast service provider combines the audio/video and interactive portions into a single signal for transmission to a receiver connected to the user's television. The signal is generally compressed prior to transmission and transmitted through typical broadcast channels, such as cable television (CATV) lines or direct satellite transmission systems.

Typically, a set-top box connected to the television controls the interactive functionality of the television. The set-top box receives a broadcast signal transmitted by the broadcast service provider, separates the interactive portion from the audio-video portion and decompresses the respective portions of the signal. The set-top box uses the interactive information, for example, to execute an application while the audio/video information is transmitted to the television. The set-top box may combine the audio/video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection or cable.

In accordance with their aggregate nature, interactive television systems provide content in various different communication protocols that preferably can be understood by the client or viewer who receives the information from the broadcast service provider/network operator. Typically the client is a set top box with a processor possessing limited processing power and communication bandwidth. Translation of the various protocols is beyond the limited processing capability available in the typical set top box processor. Moreover, there a multiple sources using a multitude of web authoring tools to create content. Thus there is a need for a robust server architecture, which receives and reconfigures the content from multiple sources so that it can be displayed by the client or set top box processor without an inordinate amount of processing or communication bandwidth.

SUMMARY OF THE INVENTION

The present invention addresses the needs of the interactive television environment discussed above. The present invention provides a method and apparatus comprising software and hardware for accepting a plurality of source content formats and reconfiguring the content for display on a client device. The content is preprocessed at the server so that reformatting and conversion at the client is not necessary. The preprocessed content also requires less bandwidth in a broadcast environment. HTML code is transcoded into a concise compact code for display at the client device. MPEG imagery is reformatted for display on the client device. The viewer or client can be a viewer at a (STB), a cellular telephone user, a digital assistant, a pocket PC or any other electronic reception device.

BRIEF DESCRIPTION OF THE DRAWINGS

Other objects and advantages of the invention will become apparent upon reading the following detailed description and upon reference to the accompanying drawings in which.

Figure 1:
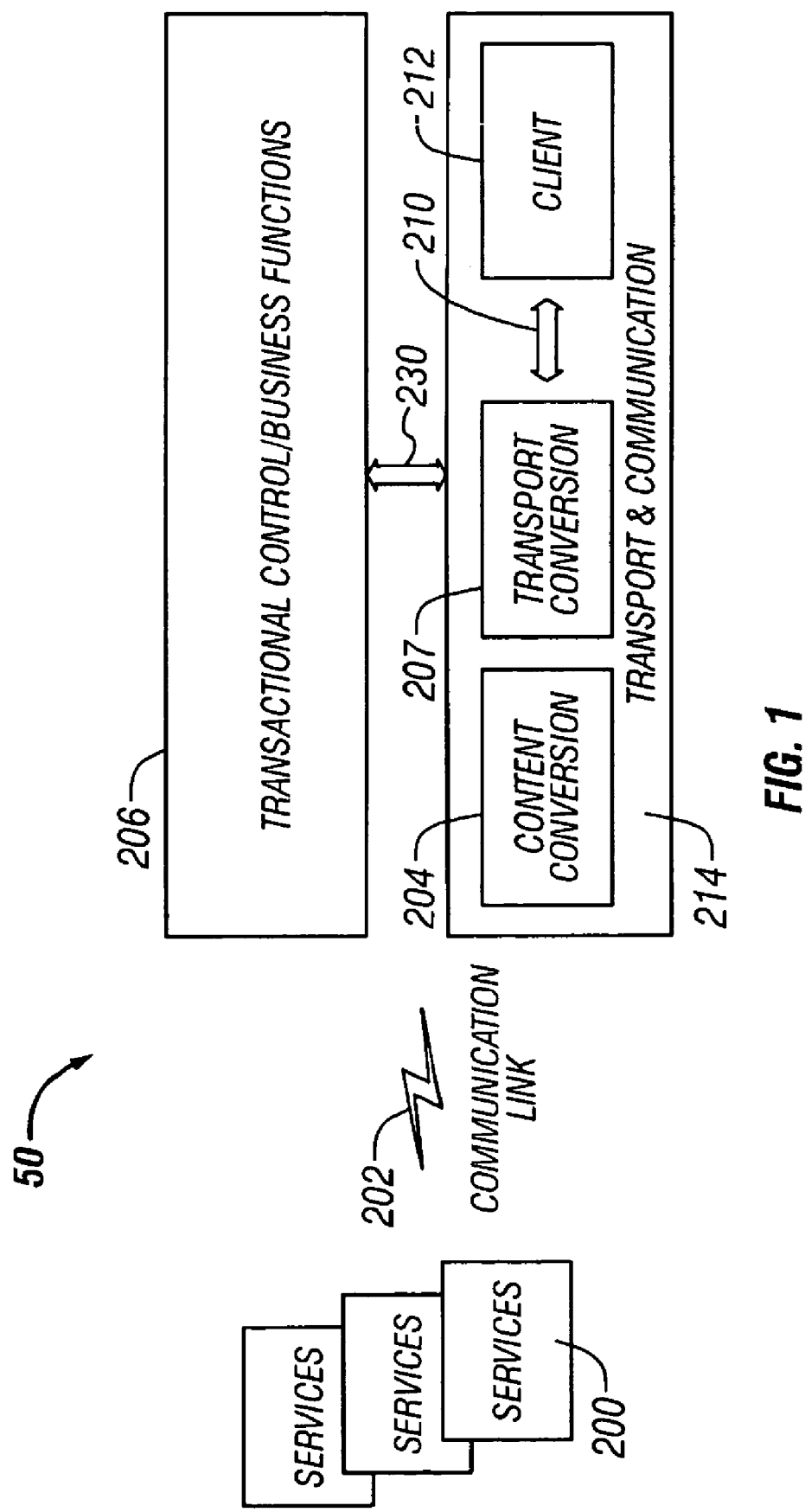
FIG. 1 is an illustration of a head-end providing content to a client device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF A PREFERRED EMBODIMENT

The following description describes several examples of preferred embodiments of the present invention. The present invention transcodes standard HTML into a concise, compact code for display of content on a client device. Thus, the transcoder off loads the task of interpreting HTML from the client to the head-end. The transcoder image can be significantly smaller than the original image. Thus, less processing power and communication bandwidth is required at the client. The present invention extracts the size, color and form image information and sends these parameters to a layout engine. The present invention converts standard HTML/JPEG data into modified transcodes comprising MPEG images and location, size and color parameters. The transcoder initially parses the HTML input, but does not know how the page is laid out. The present invention separates the location, size, color and form parameters from standard HTML input and uses these parameters to lay out the modified page to be displayed at the client device.

Standard HTML is designed for page oriented, page specific presentation, wherein the HTML specifies precisely where each HTML element should be located on the page. The standard HTML input uses JPEG, PNG or other bit map oriented image formats to represent Web pages and content. The present invention uses MPEG and lay out parameters to represent images on a page for display at a client device.

MPEG requires a module 16 position location, thus the present invention provides a buffer surrounding the MPEG representation of the image to insure that the MPEG image x and y locations are module 16 aligned. This modulo 16 buffer space, however, makes the image larger than original size. Thus, the buffer size is taken into account by the lay out engine so that the larger image size does not overlap text or other imagery adjacent the image. The MPEG representation enables the present invention to move MPEG images around on a MPEG background for display on the client device. Thus, the layout engine may not strictly follow the HTML layout to avoid overlap in the client display space.

Standard bit map oriented representations merge all imagery and text representing a page, so that individual images within a page cannot be moved around in the page. The standard HTML/JPEG representation is also an order of magnitude larger than the MPEG representation. Thus, the transcodes generated by the present invention require less transmission bandwidth in the client display space. For example, a bit mapped image page for a 600×600 pixel screen may occupy 500 Kbytes of data. The same page can be represented as MPEG files in 30 Kbytes and have true color.

The present invention does not utilize standard Cascading Style Sheets (CSS) as normally utilized with HTML. The present invention converts the CSS into an HTML element node tree in a lay out engine. This is advantageous at the client, for example, to determine style locally at each node rather than referring to a CSS to determine the style or color of a node representing a modified HTML element. The processor in the client has typically limited processing power and thus using the element mode tree, does not have to go to the CSS to determine a style for a node for an HTML element. The client does not have to determine what class a node belongs to determine a node's style. The present invention computes the root and puts the style, color, etc. with each HTML element node in the node tree. Thus, once at the client, the element node tree enables a client to manipulate down to each node and change the characteristics, for example, color, for a node, if desired. This is not easily done otherwise, for example, with Microsoft Internet Explorer, determining CSS class structure and attribute is compute intensive and inappropriate for the low processing bandwidth of the typical inexpensive client processor.

The present invention also calculates the ratio variations required between standard HTML presentation and, for example, NTSC presentation on television or other client device. The ratio conversion is necessary so that HTML shapes are not distorted when displayed on a client device. Without ratio conversion, a HTML circle may appear as an oval on a client device.

The present invention provides MIME handlers to read the JPEG and header for size, location and form. Another MIME handler performs the ratio conversion and converts JPEG to MPEG. The computed buffer zone for the MPEG imagery is calculated by a MIME handler and passed to the lay out engine.

Thus, the present invention enables standard form content from a variety of content providers (Amazon.com, etc.) generated by a variety of Web authoring tools, to be displayed on a client device. The client display appears like a standard browser display, for example, Microsoft Internet Explorer (IE). The present invention enables display of this disparate content without requiring the content provider to utilize special tools for formats to provide content to the client device, thereby simplifying provision of content to the client device. Turning now to FIG. 1, the Service Platform 50 comprises a group of applications roughly divided into three categories, Content Conversion 204, Transaction Control/Business Functions 206 and Transport Conversion 207. The Service Platform enables services 200 to interact with a client 212. The services 200 communicate through a communication link 202 to the Service Platform 50. The Service Platform 50 in turn communicates with a client 212. The client 212 may be a STB, a digital assistant, a cellular phone, or any other communication device capable of communicating with the Service Platform through communication link 210. The Content Conversion 204 and Transport Conversion 207 services provide the transport and communication function, and the Business Function services provide the Business Control functions.

Figure 2:
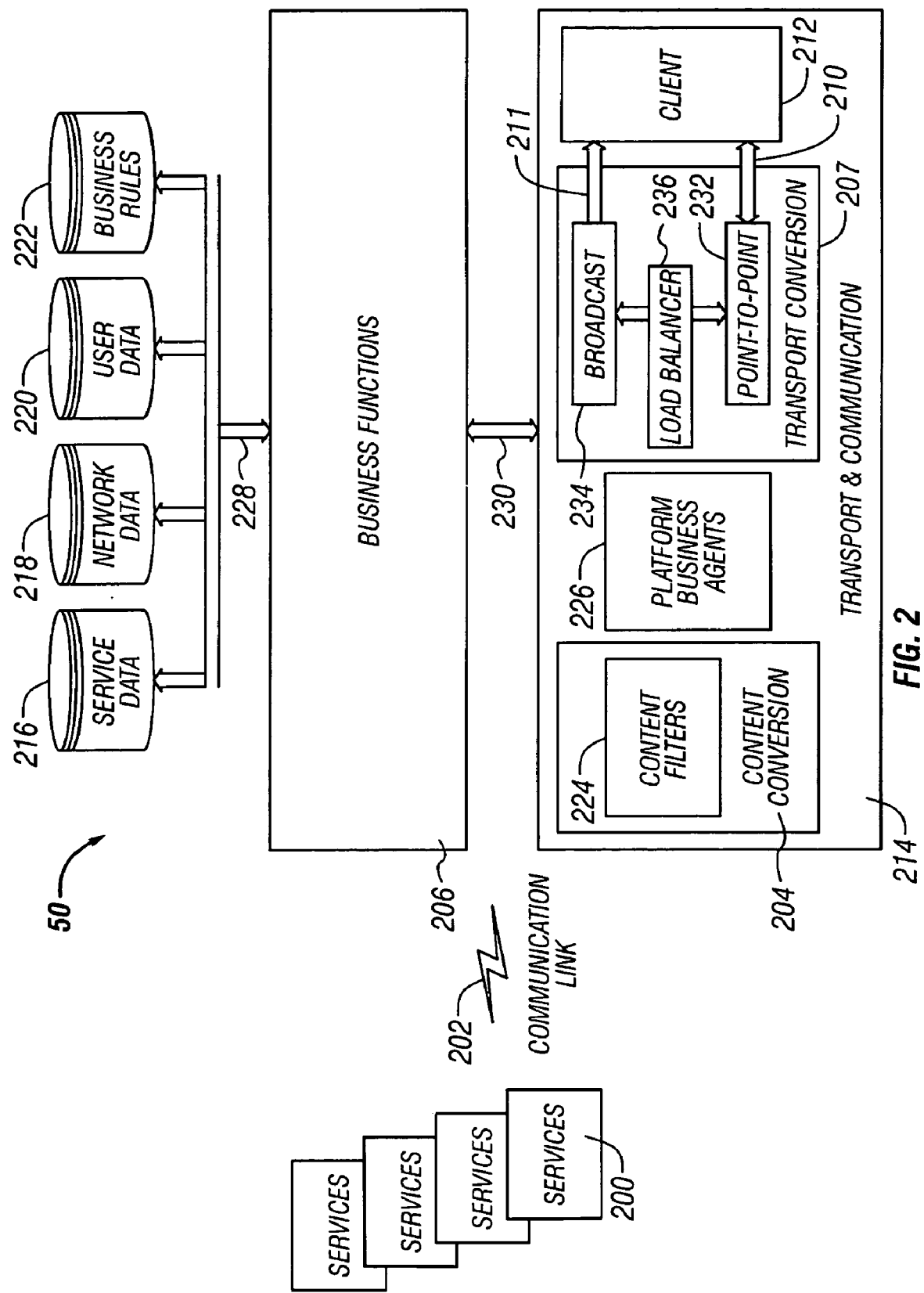
FIG. 2 is an illustration of a head-end providing content to a client device.
Figure 3:
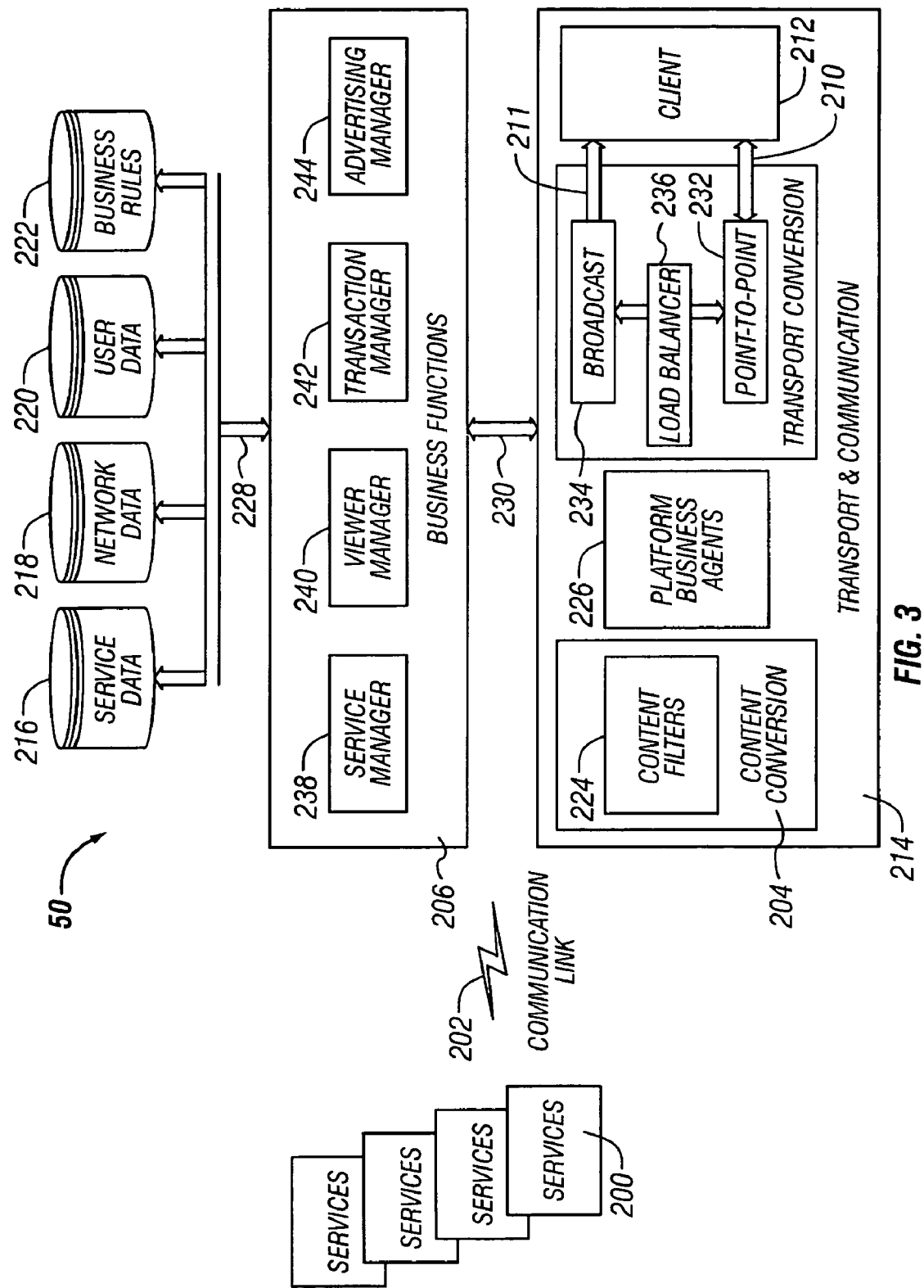
FIG. 3 is an illustration of a head-end providing content to a client device.

As shown in FIG. 2, transaction Control/Business Functions 206 is distributed between the Service Platform and the client 212. For example, a client can perform some business functions (e.g. implement advertising campaign rules and advertising/business filters to select advertisements viewed) and select contents, which are more suitable to the client 212 (e.g., select an advertisement or program which fits the user profile). The functions of FIG. 2 are expanded in FIG. 3. As shown in FIG. 3, the Business Functions 206 comprise four major functional components: Service Manager 238, Viewer Manager 240, Transaction Manager 242, and Advertisement (Ad) Manager 244. One example of a high-level operation flow for a preferred embodiment follows.

Referring now to FIG. 3, a Service 200 negotiates with a network operator to offer a service to subscribers via the Head-End operator's Service Platform. The network or Head End operator uses the Service Manger 238 to register the services and the negotiated business rules 222 (e.g. schedule, bandwidth requirements, service access to viewer information) associated with the service. The Service Manager 238 stores Service data 216 (e.g. URL address, content). Based on the business rules 222 and Service Data 216, Service Manager 238 communicates with the Broadcast Communication 234 function to retrieve the content from the content provider.

When the content is retrieved from the Service 200, it may be processed by the Content Conversion 204 and Content Filters 224 to convert the content into a form suitable for the client device 212. The Broadcast 234 function converts the content into a form suitable for the broadcast 234 network. The client 212 receives the converted content over broadcast link 241. Client 212 and Service 200 interact via Point-to-Point link 210 and Point-to-Point function 232, which are part of Transport Conversion 207. The service 200 may comprise shopping, audio/video, gaming, voting, advertisement, messaging, or any other service.

Client 212 communicates through Point-to-Point 232 communication link to the Service Platform 50 and Service 200. Load Balancer 236 interacts with the Business Functions 206 to determine the optimal load distribution between the Broadcast 234 Communication link 241 and the Point-to-Point 232 Communication link 210. The Platform Business Agents 226 use business rules 222 to control the interaction and exchange of information between the Service 200 and the client 212. For example, the network operator may choose to prevent Service 200 access to user information. Service 200 preferably pay a fee based on the Business Rules 222 and Service data 216 to access the user information. Viewer Manager 240 stores client/user information in User Data 220. Platform Business Agents 226 control the flow of viewer information to the Service 200. Transaction Manager 242 records transactional information exchanged between the service 200 and Client 212. Based on the Business Rules 222 and the User Data 220, Advertising Manager 244 determines which advertisements and which type of advertisements will be presented to the client via Broadcast 234 link 241 and Point-to-Point 232 link 210.

Figure 4:
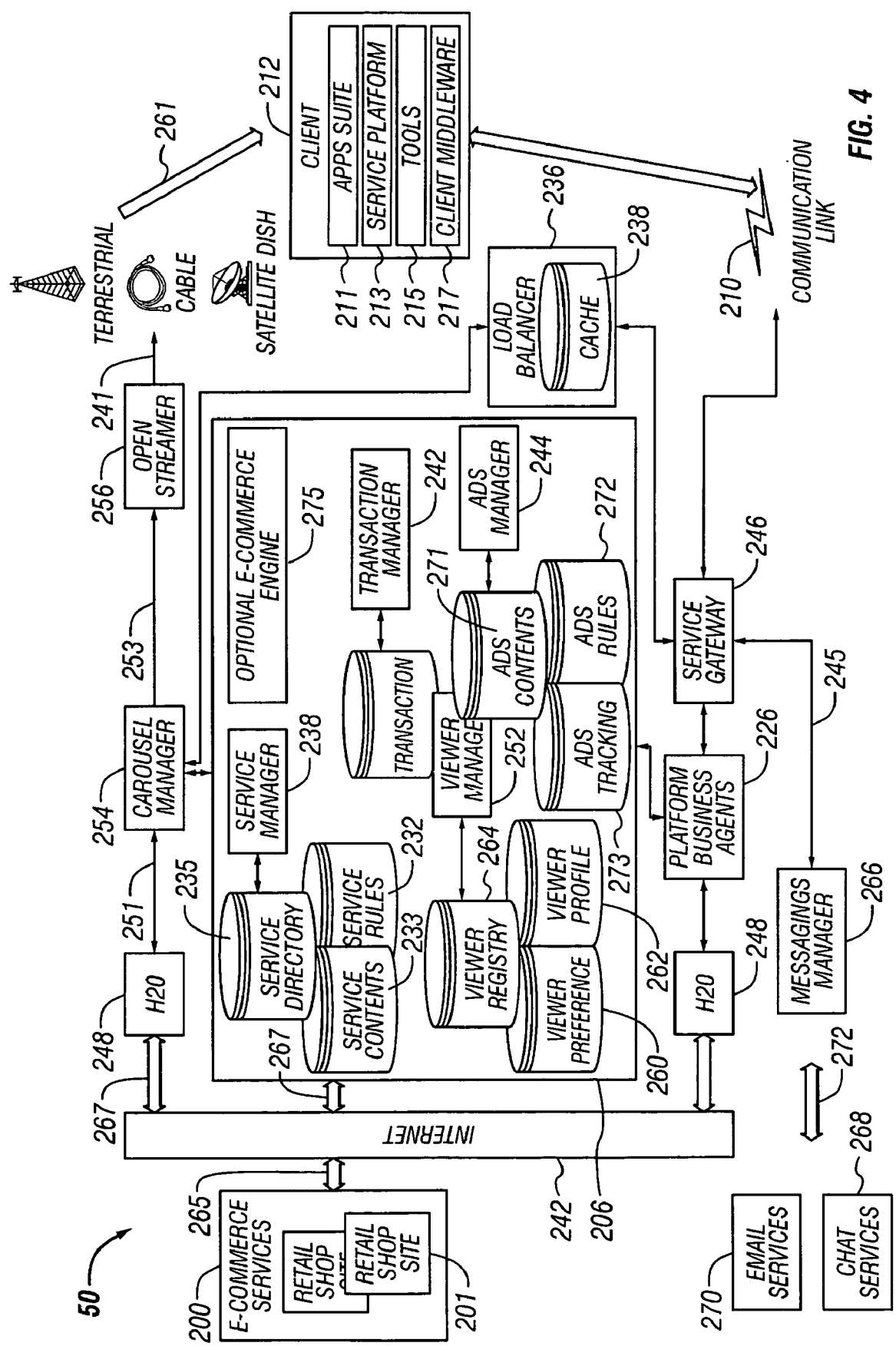
FIG. 4 is an illustration of a head-end providing content to a client device.

FIG. 4 illustrates another example of a preferred implementation of Service Platform 50. Services 200 provide shopping, chat, and other services either over the Internet or over another network or communication channel accessible to the network operator. Using the Service Platform, the network operator accesses those services. Business Functions 206, comprising Service Manager 238, interact with Carousel Manager 254 to retrieve content from a Service 200. The carousel comprises a repeating stream of audio/video/interactive data broadcast to clients from the Service Platform 50. Carousel manager 254, transaction manager 242 and Service Manager 238 control the content insertion and deletion from the broadcast carousel. Service content is retrieved, converted into a client suitable format by H2O 248. H2O 248 is a possible implementation of Content Conversion 204 and Content Filter 224. H2O converts HTML Content into Service Platform/Client readable content. The converted content is formatted into a data carousel and multiplexed by the Open Streamer 256 for broadcast to the client 212. Client 212 interacts with the services and if necessary communicates with the Service Platform and the Services 200. Point-to-Point communication goes through Service Gateway 246. Service gateway 246 performs transport conversion to convert the STB protocol into a form Platform Business Agents 226 and H2O 248 expect and understand. Load Balancer 236 interacts with Business Functions 206, Carousel Manager 254, and Service Gateway 246 to determine the optimal load between the Broadcast link 241 and the Point-to-Point Communication link 210. Business Functions 206, interact with the Platform Business Agents 226 to control access and information exchange between the Services 200 and client 212.

H2O

In a preferred embodiment of the present invention, H2O is a client/server solution, which enables Internet content developers to build interactive TV applications and services for network operators running the Service Platform. The Service Platform enables viewer access to the larger pool of Internet talent and content made available to the vast growing worldwide market of interactive TV applications. The H20 server converts Internet content (HTML pages, ECMA Scripts, and HTML page formatting) into Service Platform assets. The H2O client renders the assets and interacts with the client. In a T-Commerce/E-Commerce case scenario, H2O enables E-Commerce shops to utilize existing Web tools to create shopping services and to interface with the preferred Service Platform (operator), using standard Web protocol.

H2O acts as a proxy to the Service Gateway and the broadcasting tools to convert Web content. Web sites use their current HTTP servers and application servers to generate interactive TV content. In a preferred embodiment, H2O converts HTML, scripts, e.g., JavaScript, and Internet graphics to client compatible code. Any other known or developed protocol can also be added to the functionality of H2O. H2O enables the Service Platform to communicate with client's STBs that are not full browser capable and to create original user interfaces. H2O enables Service Platform connection to any commerce engine that uses only HTML. H20 is responsible for converting Web content such as HTML pages, JPG pictures, wave audio files, etc. into client device compatible resources that can be easily utilized with minimal processing capability and bandwidth at the client device.

The server side of H2O is an HTTP proxy, H2OS. For other purposes, it can be packaged as a DLL or batch tool. The client side of H20, an STB OCOD application, is H2OC. H2OC is built on top of other Service Platform client components, such as the Service Gateway library or the Carousel Load library. H2O enables URLs to be used to address documents and services. H2O enables tracking in the broadcast and online environments. H2OS provides HTTP proxy functionality. Service Platform applications request a document through H2O. H2O retrieves the document, parses it, compiles it, and returns the document to the requester. This H2O functionality enables use of the same engine for different uses, online and broadcast, facilitates scalability, and enables flexible use of H20. The parsing depends on the type of document, e.g., parsing can be HTML parsing, a GIF picture, or JPEG images, etc. To make H2O expandable, H2O provides a function to "plug-in" and run new third party converters and filters.

H2O enables scripting using different languages. Preferably, all Service Platform server components standardize around monitoring, especially the ability to remotely manage the different processes. SNMP is used to handle basic functions ("process OK", and traps on major problems). A command-line interpreter on socket for inspecting status is also provided. Setting parameters enables remote management and interface with the Web through Web scripts. In a preferred embodiment, standardized warnings and error logs are provided.

H2O sends Email to the Service Platform Messaging Manager for error notification. Unsupported functions, tags, etc. cause the page to be rejected and an error message sent. H2O enables controlled positioning of graphical elements (x, y, z). The output of Service Platform preferably comprises resources that do not duplicate assets in the broadcast. H2O supports assets comprising, Imagery (JPEG, BMP, MPEG, GIF), Audio (set-top native) and Fonts; Animation (GIF), Binary (to be used by third party gadgets), CLUT (Fixed for an entire email) and dynamic control anywhere.

H2O supports special tags comprising: AN control, channel control; on screen display (OSD) control; and Triggers. H2O Supported W3C tags comprise: controlled positioning of graphical elements (x, y, z). JavaScript libraries are provided comprising Math, DOM partial, and Date. The client side of H2O, H2OC composes graphics assets in the client or STB. H2O enables updated display of a user viewed page upon reception. H2OC utilizes libraries (communication, carousel, et al.) are provided by other Service Platform components. H2O enables refreshing an entire page in one shot, but also provides an option to choose between partial updates as assets are loaded, versus waiting for all assets to load. H2O enables dynamic linking/unlinking of third party classes.

HTML/JS optionally does not share information from one page to another for the Web, as the server takes care of the context. In broadcast mode, this arrangement is insufficient. In broadcast mode, preferably, a global permanent object is provided, that is not cleared when starting a new page. The permanent object maintains context between pages. Other base objects provided by the Service Platform are also made permanent on transition (e.g., station control, OSD). Gadgets are defined through an interface definition language to enable creation of new gadgets, modification of gadgets and to enable adding methods without modifying the compiler.

The H2O Carousel feature provides real-time updating of catalogs, maintaining consistency of catalogs during updates, and providing safe transactional models. H2O carousel enables updating a single page, or an entire set of pages in a single transaction. Carousel management provides management of a carousel index or directory. The index contains information for accessing and fetching data from the carousel. That is, for a given page, Carousel Management contains a list of all modules necessary, so that H2OC requests all necessary modules at once to expedite the process.

Carousel provides data compression, Meta data on pages (e.g., page relative priority, how often the page is sent) and page tracking (elementary stream). The Carousel client is a STB OCOD library, handling the loading of resources. Carousel client manages dynamics of resources, i.e., new resources, deleted resources, and changed resources. Dynamic resource management enables the client (H2OC) of this library to present dynamic content. The Carousel client manages memory allocation, pre-fetching and caching of resources, and decompression of modules. The Carousel client manages sub-index/directories and manages a 'set' of resources instead of a 'tree' of resources, which facilitates sharing of assets. H2O monitors TV triggers, performance, and bandwidth, e.g. shared resources in shared modules. H2O optimizes bandwidth utilization. H2O provides multi-tracks, multi-priorities, and management of bid volume of data. H2O provides run-time pre-fetching and caching at the module level. H2O supports compressed modules. Surfer built-in GUI is minimal or preferably zero. H2O supports arrow and direct key navigation (e.g. digit or color), Handling international (Chinese); Meta data on pages, (e.g., page relative priority, how often it is sent) and page tracking (elementary stream). Global GUI is shared, that is, a direct key linking is provided so that every other page can share any information page.

H2O manages pages and sub-pages to handle cases where pages are too large to fit on one screen without the need for scrolling. H2O enables use of HTML to present content, online, point-to-point, and broadcast. H2O enables composition of a page with a mixture of broadcast and online components. For example, a page can come from an online server, while its background is broadcast. H2O enables merger of content in the client/STB. For example, a bank application can send a viewer's last 20 VISA® transactions from its server while the HTML page is broadcast. Preferably a Java Script function request (HTTP like), using the result and some DOM functions patches a table with the result.

Figure 5:
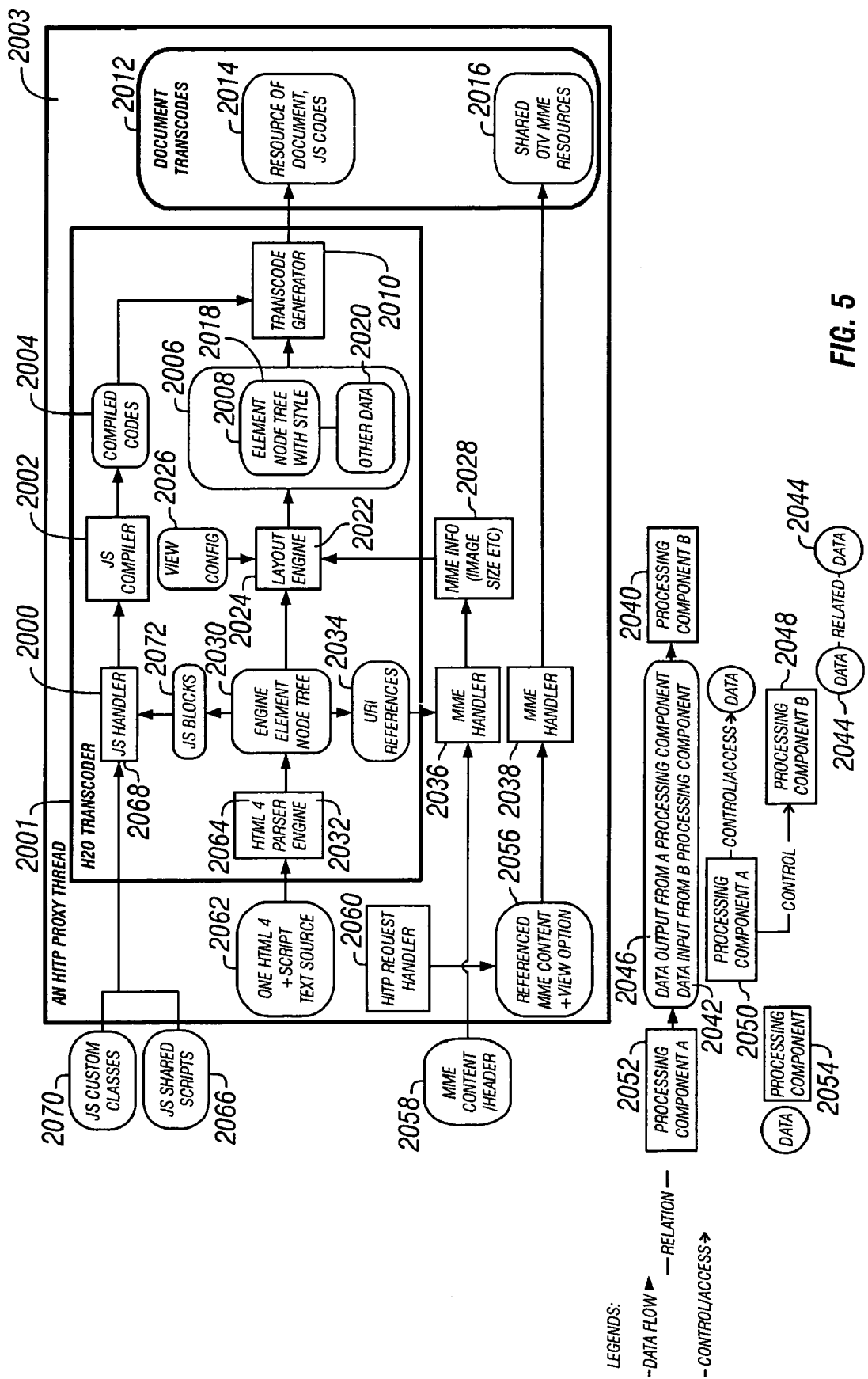
FIG. 5 is a H2O HTML Transcoder architecture diagram.
Figure 6:
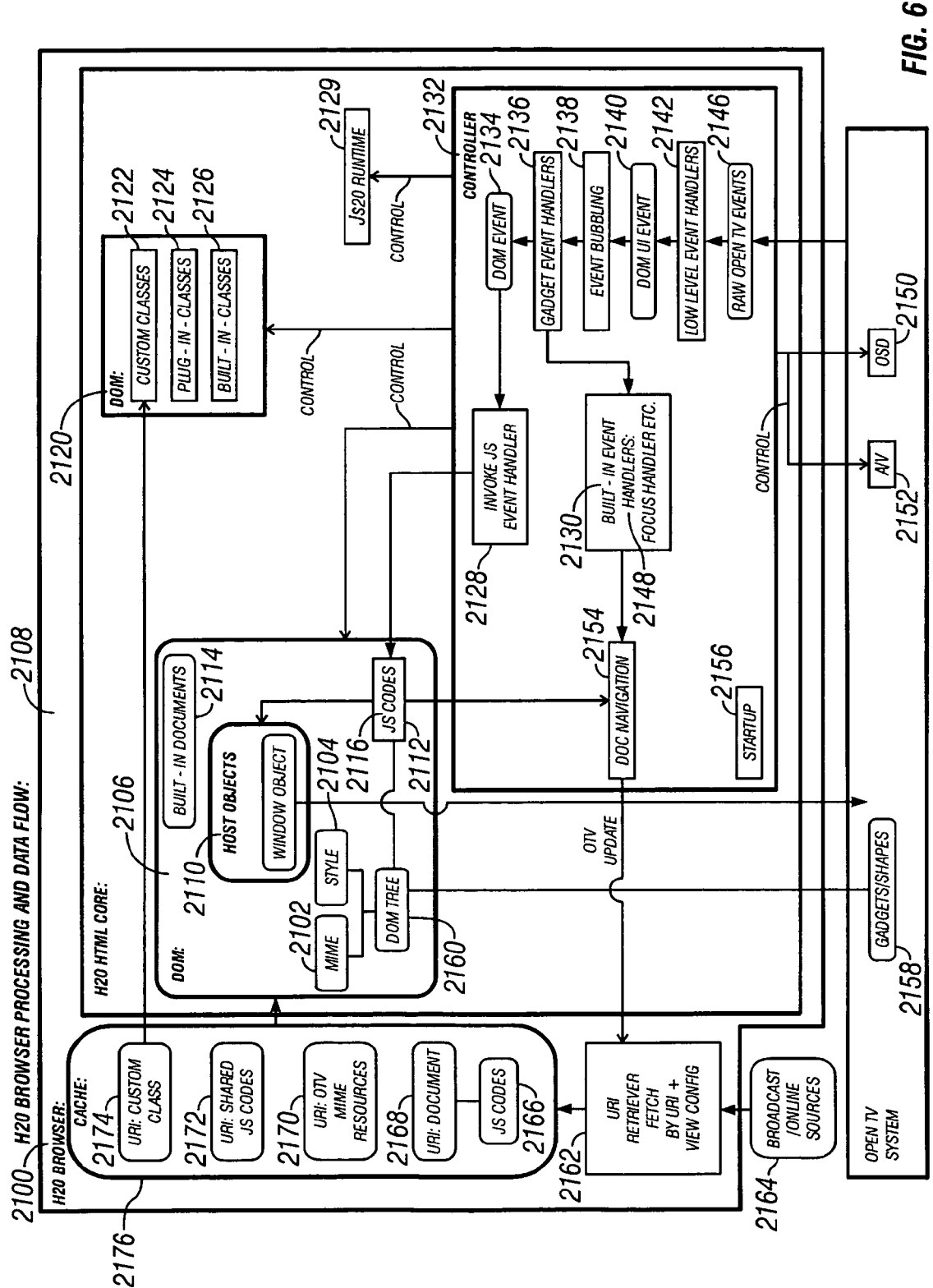
FIG. 6 is H2O Browser processing and data flow diagram.

Now turning to FIGS. 5 and 6, a discussion of the main H2O components follows. H2O transcoder 2001 converts HTML inputs 2062 into H2O transcodes that can be efficiently and interactively viewed by an H2O Browser in OpenTV STB. The H2O Browser views H2O transcodes in limited Dynamic HTML4 fashion. The host, such as HTTP proxy 2003, invokes H2O Transcoder 2001. H2O Transcoder 2001 interfaces with MIME handler 2036 and MIME info 2028 for content information in non-HTML MIME type. The resource compiler is multi-thread safe. H2O Transcoder invokes H2O JavaScript Handler 2000 to take scripts as input, fetch external scripts or class URI, invoke JS2O compiler and pre-link JavaScript. The JS handler processes JS custom classes 2070 and JS shared scripts 2066. The H2O Browser 2100 interfaces with JS2O JavaScript runtime 2129 for JavaScript support. H2O Browser interfaces with URI Retriever 2162 to retrieve content by URI. H2O Browser 2100 typically uses URI Retriever 2162 to make HTTP URI request and get response, and to handles cookies. H2O Browser uses image library, and event library. H2O transcoder is invoked as a library as part of the task (process or thread) in a high performance HTTP proxy. H2O transcoder contains a HTML parser/layout engine source as its major component. In the context of that hosting environment (proxy server) received HTML URI requests and fetches HTML text source, the H2O transcoder provides an interface for hosting the environment to control. The H2O Interface comprises: H2O_transcoder; method:

H2OS_generate_transcode. Input: memory block of MIME type text/html, target view. Return: memory block of transcode type. Behavior: Parse, layout input HTML content and generate transcode type, which is ready to be used by H2O browser running on the client device, preferably a STB. H2O transcoder executes synchronously and is multi-thread-safe.

When processing HTML input, the H2O transcoder discovers all URIs that are statically referenced and in the HTML input. The H2O transcoder uses URI handler 2034 to fetch the list of URIs and references needed and returns information that the H2O transcoder uses. The H2O transcoder uses the URI content information, that is, the width and height of the information to be used in the layout process.

The MIME interface handler is exposed to the H2O transcoder as follows: Interface: MIME_handler; method: MIMEHandler_handle_uri; Input: URI string with accepted MIME type, view option, processing options. MIME type: pixmap, bmp, gif, jpeg, font, color table, JavaScript text, MPEG audio, SP code module and data resource module. Return: MIME content information, not necessarily the full content; Image usually contains information of type, height, and width for the layout engine.

Behavior: Run as a task, fetch MIME content through host HTTP proxy, process MIME content as requested. Preferably an interface is provided with proxy host to handle the caching mechanism for better efficiency. The H2O transcoder executes synchronously. A subset of HTML4 features is supported in H2O transcoder. HTML4 content is rendered by the transcoder to a particular target view, in the rendering process almost all rules of HTML elements and attributes are applied and style rules including default styles are computed. The dynamic features of HTML4 (mainly style and DOM interface) are restricted through limited DOM interfaces in the present invention.

The H2O Browser supports a selected subset of the HTML4.01 W3 standard. The H2O browser supports a subset of text: paragraphs, lines, phrases; subset of list; subset of table and subset of links. The H2O browser also supports a subset of Object and Image element. The H2O browser also supports a filter authoring-side object (e.g., IE custom object) and supports runtime custom objects for the STB; both authoring-side (PC) and STB custom object class development; subset of image map (client-side, server-side); subset of form and form controls; various Script elements; and a subset of JavaScript.

The present invention provides functionality that defines color map extension elements. The present invention provides functionality that defines client tags extension, supports a subset of CSS and limits CSS, mainly for viewing options for a client display, preferably a TV screen. The present invention supports a subset of W3 standard CSS in the H2O transcoder. Most CSS features are supported in H2O Transcoder. The dynamic features of CSS are restricted in the H2O Browser. The H2O Transcoder applies the CSS to the document layout and presentation. In H2O transcoder, the HTML nodes contain once-computed CSS information in element nodes. Very limited, if any, additional CSS is preserved. This is fundamentally different from the dynamic cascading rules of CSS. Dynamic style is limited as a style change preferably is applied to only one node. This means that in order to query through DOM a property of the style of a particular element and expect it to return a valid value, the style property (e.g., style=color: red) is explicitly specified for the element inside an inline style, or explicitly created in a JavaScript code in order for a PC emulation to behave similarly.

The present invention supports top, bottom, left, right absolute positioning styles, but preferably does not support z ordering, although, in an alternative embodiment, Bordering is supported. The H2O transcoder defines target STB style for the layout engine comprising body margin, view style (OSD region and dimension, width limitation), mpeg background or not, and transparency rules. The Mpeg slice image in the layout flow is padded with extra layout bounding box size to accommodate the 16×16 block alignment Mpeg requirement, which does not conform to typical browser layout fashion. The present invention defines style rules/attributes by configuration and explicit specification to specify conversion of content to an MPEG background and slice from other MIME type content. The present invention resolves multi-line anchor information in server side using only a first line anchor or image as an anchor. The H2O transcoder generates style information for focus highlight information. Limited style information is stored in transcoder.

The present invention supports a subset of HTML DOM in the H2O Browser. The present invention also provides for HTML parsing exception handling.

The present invention enforces a strictly defined HTML subset either by the parsing engine or in a separate validation module. The HTML parser engine handles invalid tag order, tag closing, tag nesting, and attributes with acceptable appearances. The HTML parser engine's exception handling (resulting in element tree difference, layout differences, etc.) is different from Microsoft IE and other standard browsers.

The H2O Transcoder controls the processing behavior of the HTML engine. The H2O Transcoder can fully access the generated data model of the parsing/layout processing. The HTML engine is reentrant safe and can be run as a library. The present invention invokes the HTML parser engine to parse HTML source and generate the engine's internal document representation (OOM). The parser engine is modified to conform to the H2O HTML/CSS functionality specification. The present invention controls the internal parsing to process elements based on a HTML4 subset definition. The present invention enables, disables, extends, and modifies HTML element parsing. The present invention adds required information into internal data model or engine (e.g., width and height of image). The present invention also handles script elements.

The present invention invokes a H2O JavaScript handler task to process Script element data. The JavaScript handler task fetches the script URI, and invokes the JS2O JavaScript compiler. JS2O returns a data package containing the compiled JavaScript code module. JS2O caches JavaScript scripts and matches repeatedly similar JavaScript scripts. The preferred layout engine lays out an internal data model for target views by configuration and explicit specification in the HTML document. The layout engine is modified to conform to the specified H2O HTML/CSS functionality specification. The present invention resolves multi-line anchor issue on the server side and uses only a first line anchor or image as anchor. The transcoder generates computed layout/style information and attaches it to the internal data model, or generates a data model. The present invention layout applies suggested width, but does not force limited width on layout.

The present invention generates H2O Transcode using client compatible resources from parser engine internal data models with layout and limited style information, and JavaScript codes. A general specification of H2O Transcode format comprises Transcode sections of client compatible resources that represent the document and JavaScript codes for the client or STB. The Transcode format contains information about the document in tree structure. The format is efficient, compact, and expandable. The format provides a version number to ensure conformance in the client or STB. The format considers compression and relocation. The efficient format enables efficient loading by the client or STB browser. The format contains enough information for the H2O browser to efficiently resolve linkage. The Version of package format is preferably synchronized with all related products, such as H2O browser.

O-Code HTML Browser

The H2O Browser 2100 views H2O Transcodes in limited Dynamic HTML4 fashion. H2O Browser interfaces with JS2O runtime module 2129 and contains internal components: OOM (Client compatible Object Model), Controller, and level 2 HTML4 Data Model. The HTML browser supports a subset of the HTML DOM standard. The HTML browser supports HTML DOM node traversal, creation, destruction, and insertion and supports element lookup by unique ID. The HTML browser resolves object initialization and references during insertion. The HTML browser supports node cloning. The HTML browser preferably does not provide dynamic parsing of HTML script to transform into part of DOM. (e.g., document.write( )). The HTML browser defines the order document view is updated to reflect changes to HTML DOM object. The preferred HTML browser does not support dynamic re-layout of layout flow in STB to reflect modification of HTML through DOM. Changes made to layout flow text do not result in re-layout, which wraps text. Layout flow text is preferably not wrapped. Though no changes are made to layout flow text, changes to text property in node objects such as Text area (text can wrap) or Input can be updated in view. These achieve the effect of dynamically updating UI objects. The HTML browser provides subset of HTML DOM interfaces and objects for JavaScript to manipulate HTML DOM objects. The HTML browser provides the same support for a C program. The HTML browser handles HTML DOM events and provides a mechanism to map an authoring side font to client compatible font. The H2O DOM interface manipulates client compatible font information.

OOM (Client Compatible Object Model).

The OOM is provided for a developer to develop custom classes. The OOM provides a mechanism to develop custom object class, load/register/un-register/unload class, and access class interface code to manipulate custom objects. The design and implementation of OOM uses JavaScript object model to avoid duplication of effort. OOM provides interface for both JavaScript's and C programs to manipulate objects. HTML, OOM, and C programs function without JavaScript. The present invention provides lightweight client-side class registry with selected naming scheme. The registry enables associating a class module with a name and lookup. OOM loads a class module and registers the module. There is only one interface for a class. Object prototype property is not dynamically bound. The interface contains methods only. Each method is associated with a string name unique in this interface scope. OOM provides a mechanism to create an object instance from a class and a Provide class referencing mechanism. OOM handles class unloading. OOM defines control flow, data flow between H2O HTML and JavaScript engine. OOM instantiates browser objects for the JavaScript engine. OOM exposes access of DOM objects to the JavaScript engine (through setting properties of global variable property of window object with implementation tuning). An object of a class is an object whose method properties are methods of the class interface. OOM defines interfaces, guideline, subset of SDK API for custom object to be integrated into view structure, view update, event handling, focus, and access to shared system resource.

A controller controls Browser behavior and components, and handles events. The controller provides fast startup time response, achieved by various techniques such as visual displaying while starting up. The preferred controller of the present invention uses system resources: event, download, mpeg, osd, A/V, etc. and controls data model and viewing. The Controller handles raw OpenTV events 2146. The controller handles primitive object events, which in turn can generate a DOM event 2140, 2134. The present invention supports DOM event 2138 bubbling and handling and uses focused node as a starting node. DOM events can be handled by JavaScript event handler 2138 codes.

A focus navigation handler 2148 is provided by the present invention that handles focus event using document tree, event properties, and style (rectangle), and handles ambiguity. Record focus history by object identifier and x, y position, and finds the best match. The controller preferably defines control flow of event dispatching, event handling, data update, and view update.

The preferred controller pre-defines element classes and thus is more efficient than custom classes. The controller using URI retriever, obtains URI content, makes HTTP: get and post (form post) requests, obtains responses and provides document open and back/forward functions. In a preferred embodiment, Data Models are mainly runtime HTML DOM, and other categories of runtime data models. HTML DOM also contains viewing information that reflects their intended effects.

The Data Model handles one single runtime HTML document, which can be instantiated from document sources, and the previous one is destructed. The data model supports preferably load/instantiate/reference/manipulate/destruct data models. The present invention provides persistent data save/read to serialize data and share data between documents. In a preferred embodiment, viewing actually reflects the UI looks of data models, and mainly reflects the actual style of HTML DOM. The viewing functionality is tightly embedded into the data model, mainly using internally defined shapes. The HTML page specifies exactly what viewing option it uses. The present invention defines specific viewing limitations such as screen dimension and ratio, color, and mpeg characteristics. There is one preferably view for one runtime HTML document.

Viewing preferably supports different color styles, and treats the color table as a shared resource. In a preferred embodiment, a limited set of MIME type handlers are provided depending on configuration to save memory. Popular HTML browsers for PC environments typically expose browser specific host objects for JavaScript runtime to manipulate. The present invention supports a subset of Microsoft IE5 host objects for JavaScript runtime.

The transcoder invokes the parser engine as follows:

HTMLengine_parse_html (C_MIME_HTML *p_in_html_text, C_ELEMEMENT_TREE **pp_out_element_tree). C_ELEMENT_TREE encapsulates the internal element tree generated by parser engine. In parser engine, find right approach to disables APPLET, BDO, FIELDSET, FRAME, FRAMESET, IFRAME, ISINDEX, LABEL, LEGEND, Q, S, STRIKE, U.

The parser engine, capability is provided to parse extension elements and generate extension element node. Internal client compatible extension elements comprise: link attributes for carousel, display Meta (NTSC/PAL, MPEG background/slice, OSD region), color table style (color bits, color name/index mapping), font (read font info from OpenTV font file).

The transcoder discovers and requests URI references for layout as follows: int HHTM_resolve_referenced_uri (C_ELEMENT_TREE *p_in_element_tree); The preferred transcoder calls int MIME_image_handler (MIME_TYPE in_type, char *p_in_uri, URI_INFO **pp_out_uri_info). Preferably, the transcoder traverses the element tree and when necessary invokes MIME handlers with URI and handling options (e.g., whether to and how to convert an image to a mpeg slice with dimension and NTSC/PAL ratio options), and fills in information in element nodes such as width and height of image, font, and color table. For images that will become a MPEG slice and its position not determined, the present invention expands the image element attribute size to achieve module 16 pixels on both width and height.

The present invention invokes H2O JavaScript type handler. The JS handler traverses the element tree to collect JavaScript global code, functions, link reference of external script, object class link reference, and host codes (from event handler attribute). Invokes H2O JavaScript handler and pass this collection. The JavaScript handler task fetches script and class MIME content, and invokes JS2O JavaScript compiler which returns a client compatible code module containing the compiled JavaScript codes. The script collection carries back handles to codes. The function is invoked as follows:

int HHTM_collect_script (C_ELEMENT_TREE *p_in_element_tree, C_SCRIPT_COLLECTION **pp_out_script_collection);

HJS: H2O Transcoder JavaScript type handler.

int HJS_handler_handle_script(C_SCRIPT_COLLECTION *p_in_script_collection, C_JS_CODE_MODULE **pp_out_js_code_module);

The layout engine in invoked as follows:

Int HTMLengine_layout_html (C_ELEMENT_TREE *p_in_element_tree, C_OTV_STYLE_RULES *p_in_default_style);

The layout engine uses information in the element tree and its own style configuration mechanism for layout. Default styles are transferred into the layout engine's style configuration and layout target view. Style configuration can take the form of callback, which requests style information. The layout engine stores layout result in element tree. The layout engine may traverse the element tree and generates another data model such as style box model. The layout engine intercepts the computed CSS information for a specific element node, finds the corresponding element node, and stores the style result in specific element node as inline style with limited cascading style information.

The layout result includes necessary style information (position, color, font, background). Position styles are translated into absolute position styles. The layout engine traverses all anchor information. If necessary, the layout engine modifies the anchor information to use only the first box or image as anchor. The layout engine traverses and marks leaf nodes that can interact (can handle click, keypress, blur, focus events) as focusable.

The transcoder traverses the element node tree and generates H2O Transcode using the internal client compatible resource generator. The present invention configures components, display, startup, etc. Static and dynamic configuration is statically determined at compile time. The present invention initializes the H2O Browser. It first initializes the controller and the controller then initializes OOM, DOM, JS2O Runtime, register event loop and event handlers, initializes URI Retriever, initializes image library, reads view option, and initializes host objects.

The present invention provides DOM built in classes. Root classes are implemented as collections of functions, and all DOM node object instances have common data members that are meant for root class to operate. The function pointers are obtained by calling the vtable predefined function that switches on a method atom query and returns the function pointers. Event handler is a list of JS event handler function pointers referenced by event type. Specific control element classes are implemented as a collection of functions and all DOM node object instances have common data members that are meant for root class to operate.

The following is an overview of the H2O Proxy environment using a logical view of H2O architecture and sample transactions. Requests for URI may come either from different H2O components—for example: STB/SGW and Carousel. The following context overview focuses on the STB/SGW issuing the requests—but the general flow of information stays the same.

A viewer chooses to interact with its TV Web page, thus issuing a request from the STB to the H2O system and waiting for a reply. STB requests are sent to the SGW, using lightweight HTTP requests (LHTTP) encapsulated in DATP messages as transport protocol. The requested object is returned through the same channel and protocol. The SGW converts the LHTTP protocol to standard HTTP over TCP/IP and issues the request to a Web Cache. The Compiled Object Cache (COC) uses its internal disk space to service any request it can serve (following a heuristic taking into account the time-to live of objects). Its role is to service all static objects (standard URLs without queries, no posted form) without querying the H2O proxy, thus reducing it's processing load. In this architecture, the COC will only store compiled objects (H2O modules). The COC machine is I/O driven.

Figure 7:
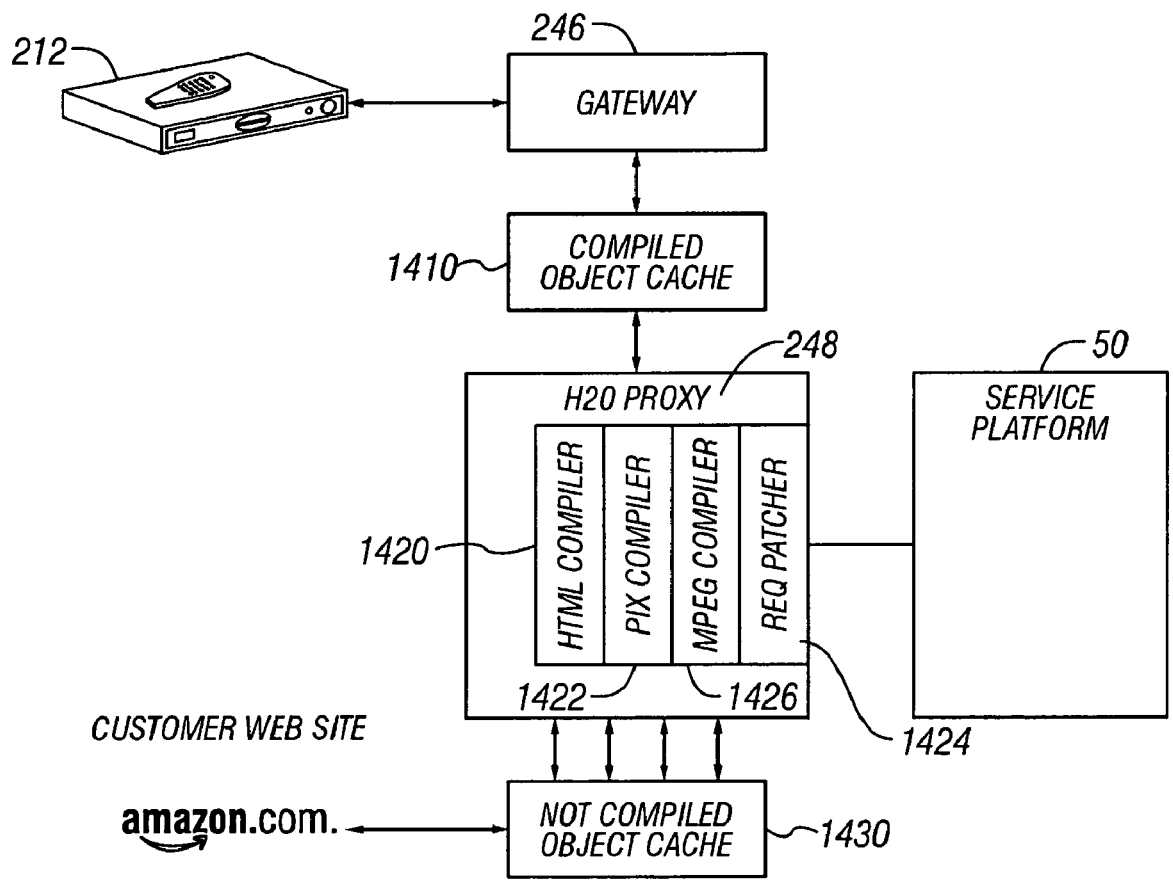
FIG. 7 illustrates an architecture for content translation, H2O.

Now turning to FIG. 7, H2O proxy 248 provides a scalable environment for the different H2O compilers (or filters) to run. It is processing HTTP request and responses "on the fly" and thus the H2O Proxy machine is process driven. The H2O HTML Compiler 1420 is in charge of HTML to SP resource compilation. To compute the TV Layout to render 1422, this component issues HTTP requests by itself based on the size of the embedded images. This compiler rearranges the Web based image to fit onto the client display device, e.g. a TV.

The MPEG Compiler 1426 directs the conversion from regular web image format to SP H2O MPEG resources. Source format includes JPEG and GIF and may include PNG. Passing arguments through the URL may drive the conversion process. The PIXMAP Compiler is in charge of the conversion from regular web images to SP H2O resources. Source format comprises GIF and may include PNG.

The Request Patcher 1424 completes or modifies the request or responses to incorporate data coming from another system (e.g. credit card number . . . ). It communicates with an external process or database to fetch customer information. The SP component provides a central repository of user information. The Request Patcher communicates with this component to get the data necessary to patch the requests or responses.

The Not Compiled Object Cache 1430 will use its internal disk space to service any request he can serve (following an heuristic taking into account the time-to live of objects). The objects cached comprise static HTML, GIF images, JPEG images, JPEG images and all standard web format files. Its role is to service all static objects (standard URLs without queries, no post form) without querying the Internet, thus reducing latency time to get an object and giving a kind of fault-tolerance to the system. The Customer web site holds the web site to publish through the H2O system.

Figure 8:
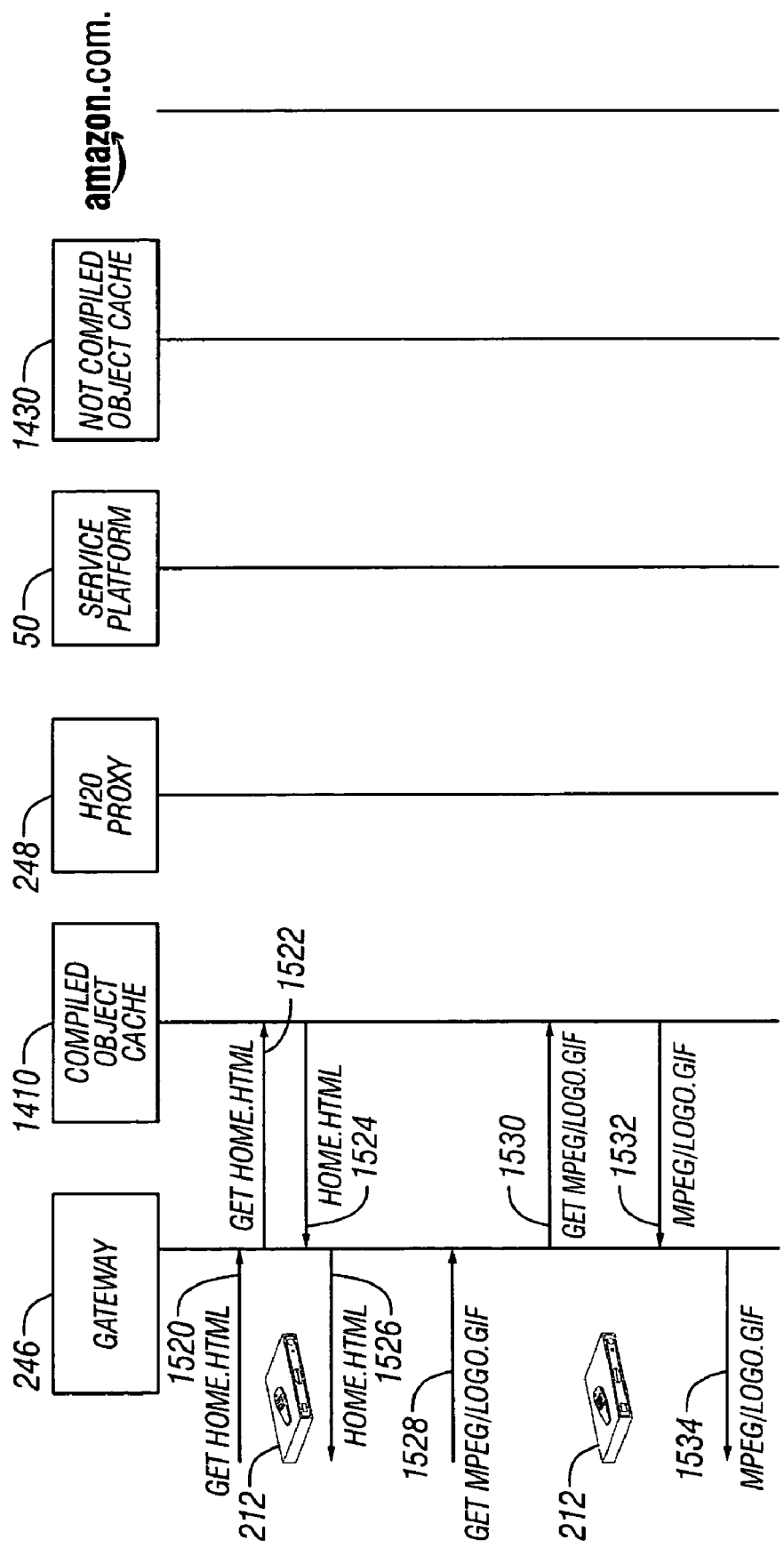
FIGS. 8–12 illustrates contend provision and display scenarios between the client/STB, H2O and application service providers.

FIG. 8 illustrates a request for a static page, already cached The STB user issues a request to load an HTML page 1520. This request is sent to the SGW 248 using LHTTP over DATP. The SGW converts the request to HTTP over TCP/IP and forwards it 1522 to the Compiled Object Cache 1410. The Compiled Object Cache 1410 has the requested (compiled to a module) HTML page stored in its internal hard disk space. If the object's time to live has not expired and the compiled object cache service the request with the compiled HTML page. It transmits the HTTP response 1424 to the SGW, using HTTP over TCP/IP. The SGW translates the protocol from HTTP over TCP/IP to LHTTP over DATP. The STB loads the requested page 1526 (compiled) in its memory and gives it to the H2O browser engine for interpretation. The H2O browser engine requests 1528 the SGW to get the images necessary to render the screen on TV, with conversion options (mpeg or pixmap, width, height . . . ) on the url. The SGW transmits the HTTP request 1530 to the Compiled Object Cache. The Compiled Object Cache has the requested (compiled to a module) image stored in its internal hard disk space. The objects time to live has not expired and the compiled object cache services 1532 and 1534 the request with the compiled image. In this scenario, the H2O Proxy was spared of the request and thus can process other requests.

Figure 9:
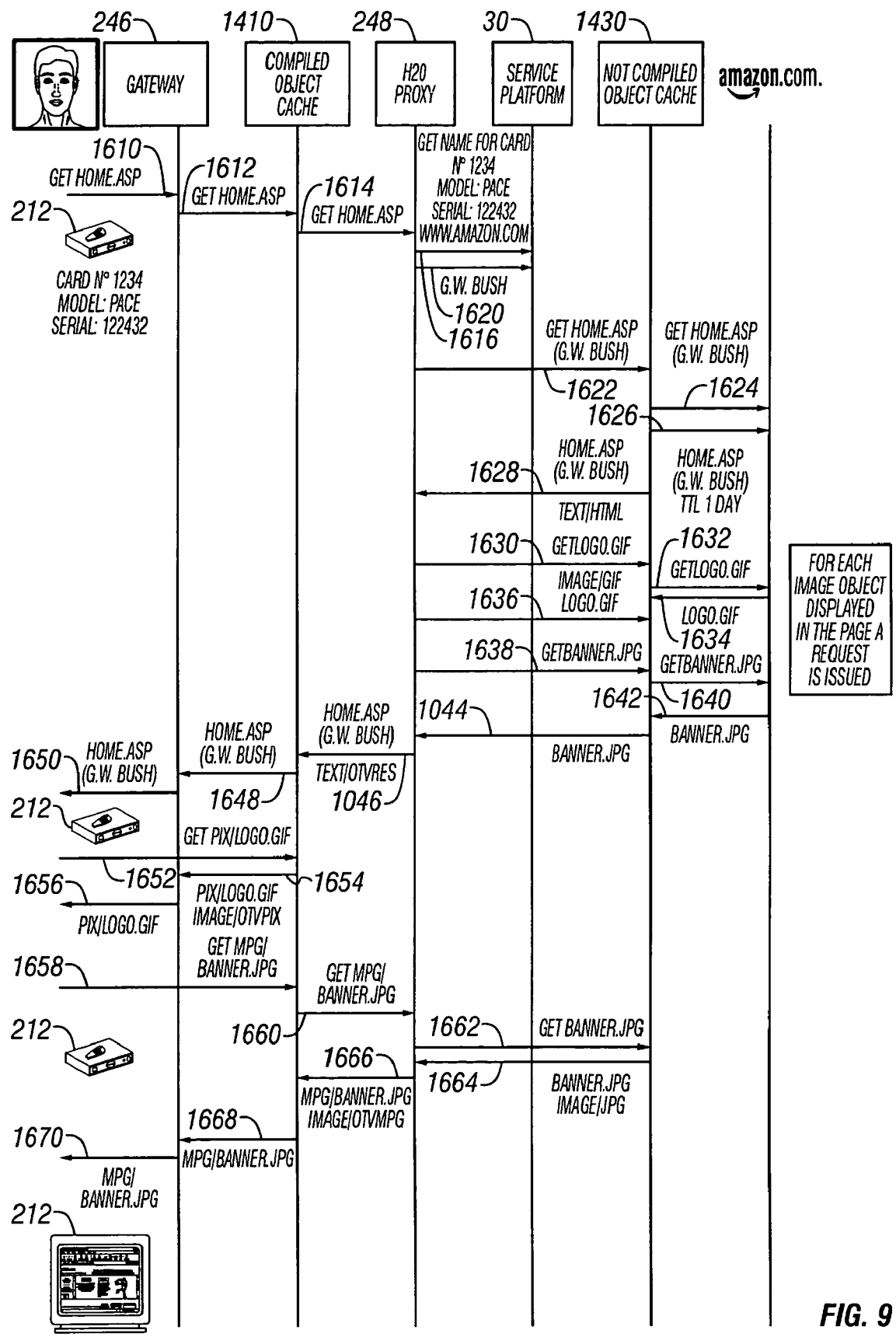

As shown in FIG. 9, the STB 212 user issues a request 1610 to load an HTML page (home.asp), the host and user info of the request header hold STB Model+STB Serial number and Access Card Id of the user. This request 1610 is sent to the SGW using LHTTP over DATP. The SGW converts the request to HTTP over TCP/IP and forwards it 1612 to the Compiled Object Cache. The requested object is not available in the disk space of the Web cache. The Web Cache then forwards the request 1614 to the H2O Proxy. The H2O Proxy 1616 asks the SP 1620 to return the name of the user (for the Amazon.com service). The H2O Proxy patches the request with the name of the user, and issues this request 1622 to the "Not Compiled Object Cache". The "Not Compiled Object Cache" does not hold the requested HTML page in its disk space and thus issues the request 1624 to the targeted web server, here Amazon.com. The targeted web server computes the HTML page, given the user information and returns it to the "Not Compiled Object Cache 1626". The "Not Compiled Object Cache" returns the HTML page 1628 to the H2O Proxy.

The H2O Proxy sends the HTTP request 1630 to the "Not Compiled Object Cache" to get the images 1632, 1634, and 1636 necessary for layout computations (gif, jpeg . . . ). The H2O Proxy compiles the HTML page; computes the layout, patches the embedded images urls and sends back to the "Compiled Object Cache" the resulting OpenTV resource 1646 (with an SP resource mime-type). The Compiled Object Cache stores the object in its internal disk space and sends back the compiled HTML 1648 page to the SGW. The SGW converts the response to LHTTP over DATP and sends it back to the 1650 STB. The STB loads the requested object in its memory and gives it to the H2O browser engine for interpretation.

The H2O browser engine issues requests 1652 to the SGW to get the images necessary for the rendering (through the patched urls: here the logo.gif url include a directive for pixmap resource format): pix/logo.gif. The SGW converts the request 1652 to HTTP over TCP/IP and forwards it to the Compiled Object Cache. The "Compiled Object Cache" already has the requested gif image, in the correct resource format—because a user already requested this image at a previous time—and the image is directly returned 1654 to the SGW. The SGW converts the response to LHTTP over DATP and sends it 1656 back to the STB. The H2O browser engine issues requests 1658 to the SGW to get the images necessary for the rendering: mpg/banner.jpg. The "Compiled Object Cache" does not hold the requested image in its disk space and therefore issues the request 1660 to the H2O Proxy. The H2O Proxy sends the HTTP request 1662 to the "Not Compiled Object Cache" to get the /banner.jpg image.

The "Not Compiled Object Cache" holds the image in its cache and returns it 1664 immediately to the H2O Proxy. The H2O Proxy converts the image, using the parameters given in the url (mpg format, width, height . . . ) and returns the result to the Compiled Object Cache 1668. The Compiled Object Cache stores the object in its internal disk space and sends back 1668 the converted mpeg image to the SGW. The SGW converts the response to LHTTP over DATP and sends it back 1670 to the STB. The STB renders the HTML page to screen.

The H2O Proxy component provides to other H2O components or compilers, a robust scalable architecture, an interface for "compiler" configuration and the ability to log errors. The ability to alert an administrator on defined events; and the ability to debug-trace the "compilers". From the provided H2O Proxy environment and APIs the compilers "patch" HTTP requests and responses on the fly, eventually accessing an external database, file or process to do so. The compilers patch HTTP requests by removing specific HTTP Header (STB identifier, Access Card Identifier . . . ); by adding specific HTTP Header (Username, Credit Card Number . . . ); by adding HTML Form fields to incoming post request (Visa Card number . . . ); and by performing string substitution ($UID$->User Identifier) the compilers convert web objects formats and mime types "on the fly" in HTTP responses and issue HTTP requests by themselves and get a response object in return.

Figure 10:
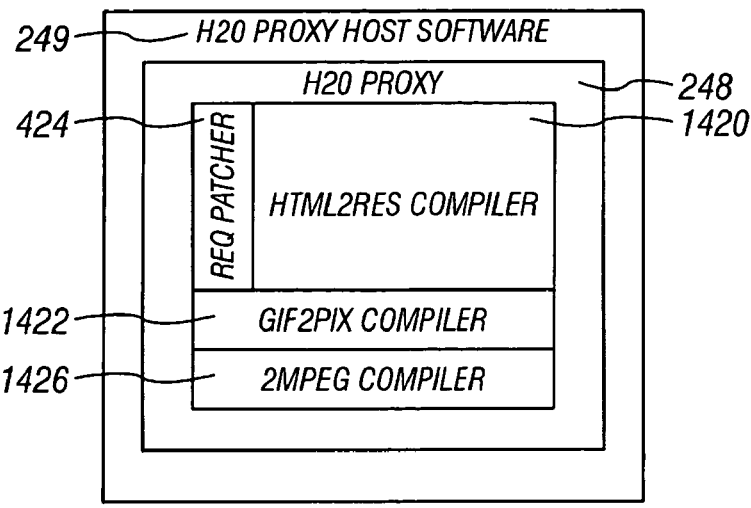

As shown in FIG. 10, in a preferred embodiment, the H2O Proxy is implemented by developing an extension of enclosing software (Web Proxy, Firewall, web server or other . . . ). This host software provides H2O threading and scheduling of the H2O tasks as well as some of the needed functionalities to implement H2O "compilers" and patching components.

Using the API provided by the Proxy Host Software, a set of API (the H2O Proxy API) is provided to implement the functionalities needed by the H2O compilers missing from the H2O Proxy Host Software Services, and provide a higher abstraction level for the services available from the H2O Proxy Host Software. The request patcher 1424 component reads incoming HTTP requests for HTML pages and completes them with information from another process or file or database. The HTML2RES Compiler 1420 compiles returned HTML pages into SP resources files and change the mime type of the HTTP response header to suit new format: Mime-Type: text/otvres.

The GIF2PIX Compiler 1422 converts a returned GIF image into an SP resource file and changes the mime type of the HTTP response header to suit new format: Mime-Type: image/otvpix. The 2MPEG Compiler 1426 converts a returned GIF or JPEG image into an SP resource file and change the mime-type of the HTTP response header to suit new format: Mime-Type: image/otvmpg.

Figure 11:
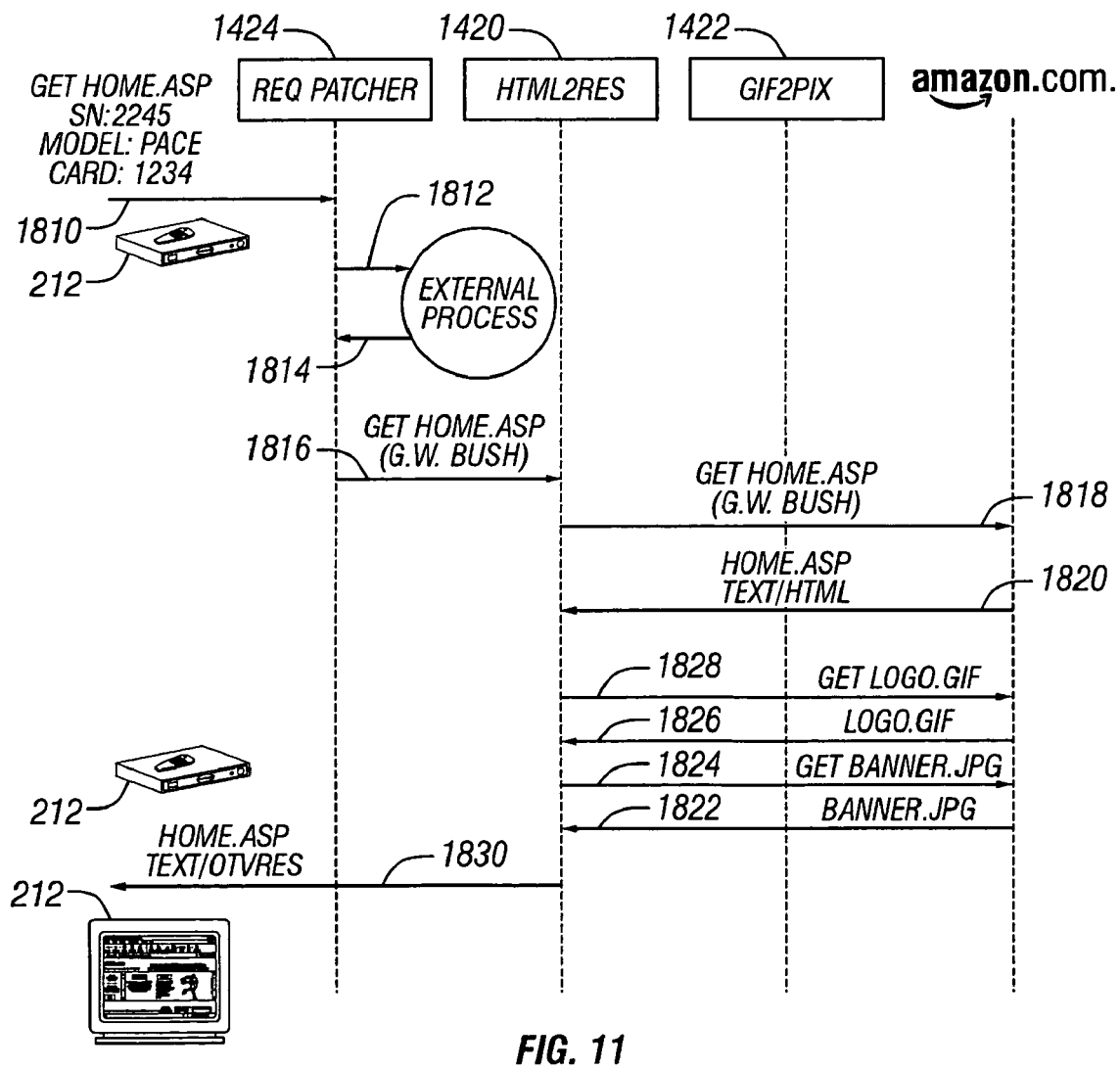

Turning now to FIG. 11, a dynamic request for an HTML page sequence diagram is illustrated. The Object Caches are not displayed in the Sequence diagram, being "passive" components in this interaction. The User STB 212 issues a request 1810 for a page (home.asp) through HTTP request. The Request Patcher 1424 accesses an external process/file/database/url 1812, 1814 to get user name, patches the request and sends 1816 it to the HTML2RES Compiler. The HTML2RES Compiler sends the request 1818 to the target web site (amazon.com). The Web site computes the request and sends back 1820 the resulting HTML page to the HTML2RES Compiler. The HTML2RES Compiler parses the file to get the image links URL and issue the requests 1822 to the web site to get 1824 the image files (logo.gif, banner.jpg). The HTML2RES Compiler computes the TV layout for the page, compiles it into SP resource file, and sends it 1830 back to the STB. The STB renders the HTML page on TV.

Figure 12:
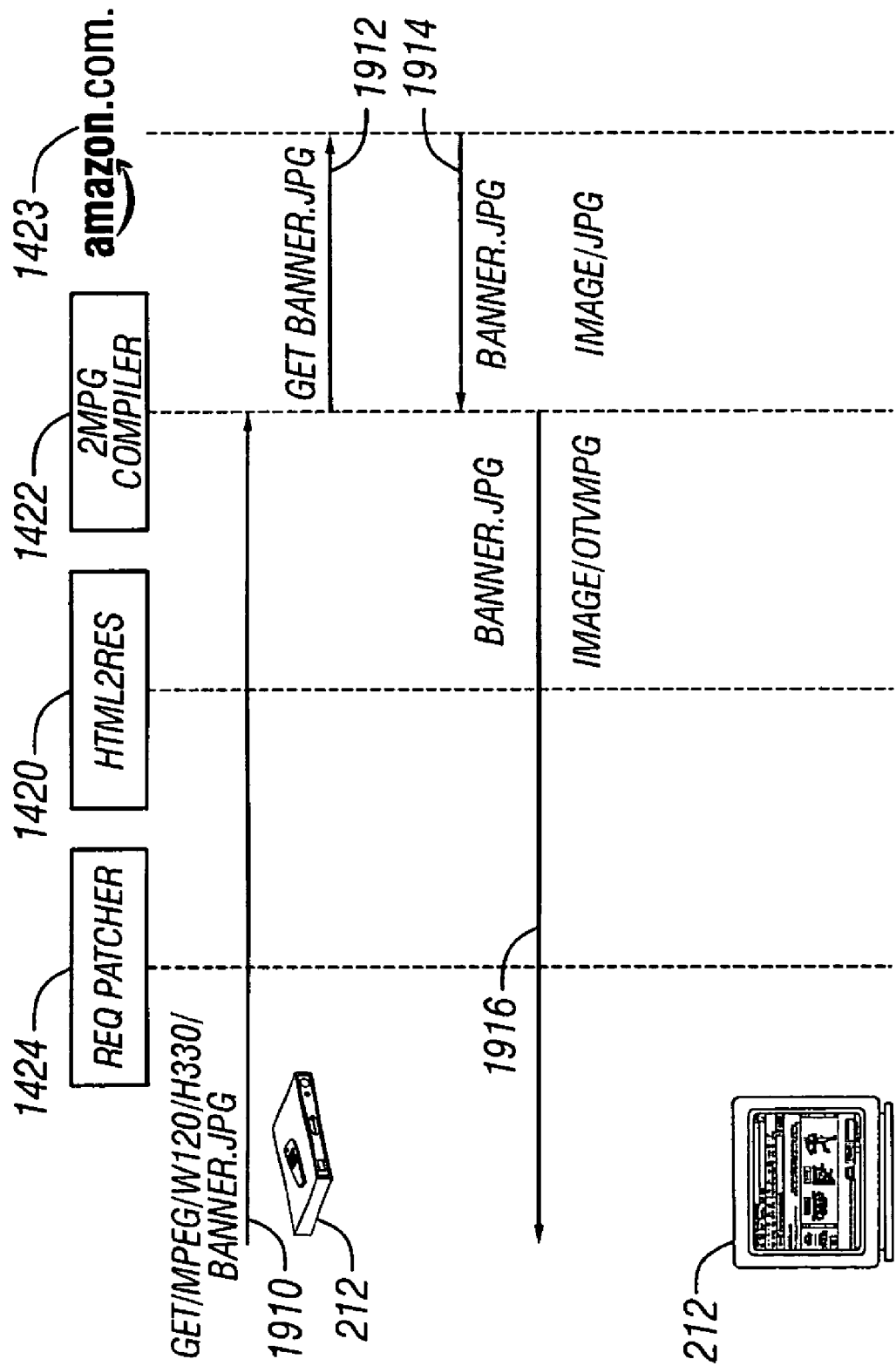

Turning now to FIG. 12, a request for an image file, sequence diagram is illustrated. An HTML page being loaded in the User STB needs an image to render its screen. It issues an HTTP request 1910 for the image (URL embedded conversion options) to the 2 MPG Compiler. The 2 MPG Compiler requests the image 1912 from the target site (amazon.com). The target site returns the banner.jpg image file 1914 to the 2 MPG Compiler. The 2 MPG Compiler converts the banner.jpg file, using the options given on the URL and returns the result 1916, with an image/otvmpg mime-type, to the STB. The STB renders the image on screen.

Figure 13:
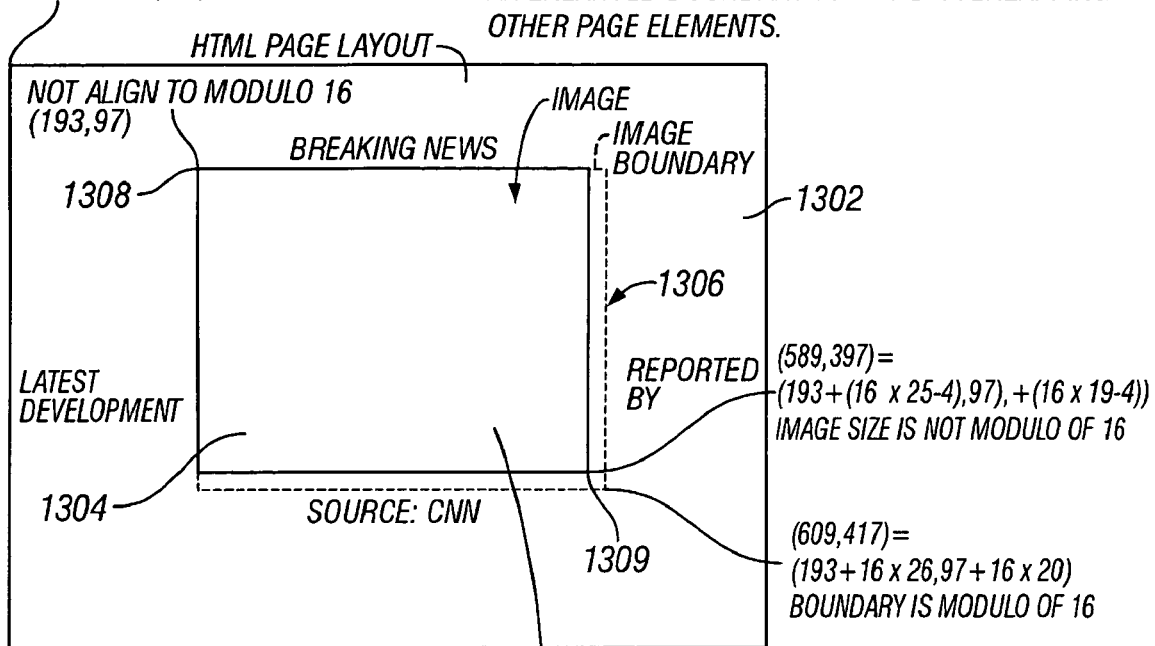
FIG. 13 illustrate conversion of a standard HTML image to a modulo 16 MPEG image for display on a client device.
Figure 13:
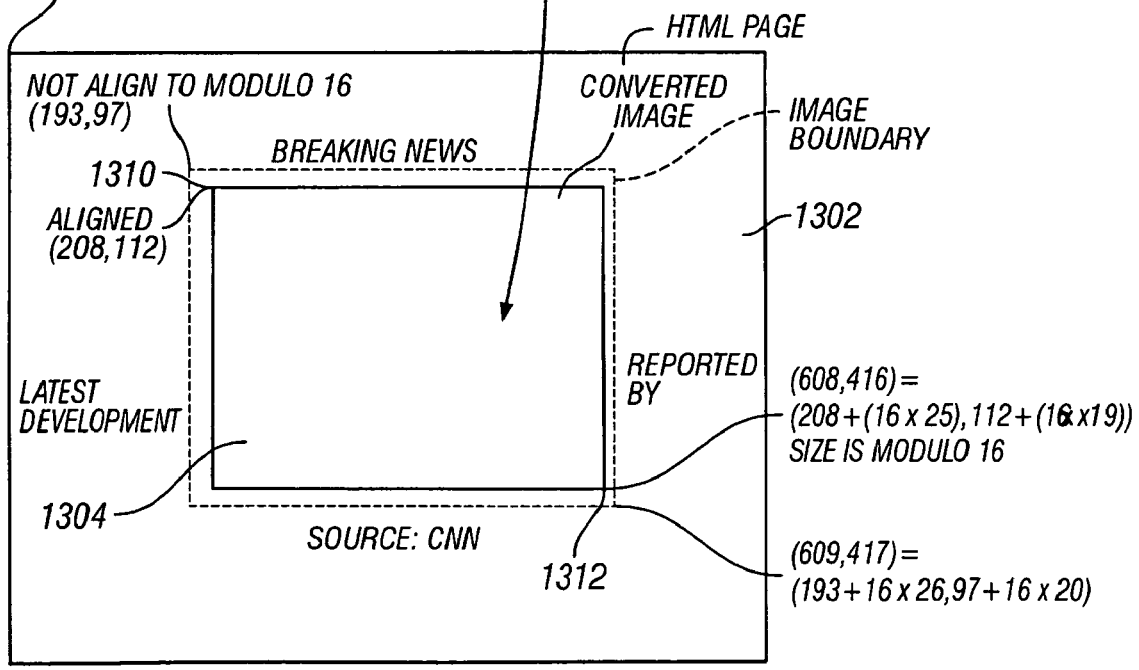

As shown in FIG. 13, Standard HTML 1302 is designed for page oriented, page specific presentation, wherein the HTML specifies precisely where each HTML element should be located on the page. The standard HTML input uses JPEG, PNG or other bit map oriented image formats to represent Web pages and content. The present invention uses MPEG and lay out parameters to represent images 1304 on a page for display at a client device.

MPEG requires a module 16 position location, thus the present invention provides a buffer surrounding the MPEG representation of the image to insure that the MPEG image 1304 x and y locations 1310 and 1312 are adjusted within the buffer space 1306 to be module 16 aligned. The origin 1308 of the boundary for the original HTML image may not be modulo 16 aligned. Since the origin and size of the displayed MPEG image at the client device must be modulo 16, the origin and size of the original HTML image are adjusted as shown in FIG. 13 to modulo 16. The layout engine takes into account the larger buffer size, which is larger than the original HTML image, to avoid overlapping other page elements on the client display. This modulo 16 buffer space, however, makes the image larger than original size. Thus, the buffer size is taken into account by the lay out engine so that the larger image size does not overlap text or other imagery adjacent the image. The MPEG representation enables the present invention to move MPEG images around on a MPEG background for display on the client device. Thus, the layout engine may not strictly follow the HTML layout to avoid overlap in the client display space.

The present invention has been described in interactive television in a preferred embodiment, however, the present invention may also be embodied in a distributed computer system comprising a server and a client device. In another embodiment, the present invention is implemented as a set of instructions on a computer readable medium, comprising ROM, RAM, CD ROM, Flash or any other computer readable medium, now known or unknown that when executed cause a computer to implement the method of the present invention.

What is claimed is:

1. A computer readable medium containing instructions that when executed by a distributed computer system cause the distributed computer system to:
   receive content at a server from a service provider containing an original image;
   extract markup language original image information from the content, the markup language original image information comprising original image size information;
   pass the original image size information to a layout engine;
   convert the original image to a target format to form a target format image and adding a pixel buffer to an x and y boundary dimension of the target format image, so that a target format image boundary x and y dimension is modulo 16 for layout on the client device display;
   calculate the layout of the modulo 16 target format image on the client device display using the modulo 16 image boundary dimension instead of using the original image dimensions;
   position the original image in the lay out engine for display on a client device display to avoid overlapping content adjacent the image when displayed on the client device display; and
   send the positioned image to the client device for display to a user.

2. The medium of claim 1, wherein the target format is an MPEG format, the medium further comprising instructions that cause the distributed computer system to:
   calculate the target format image boundaries wherein X_original and Y_original are the original image x and y dimensions X_modified_boundary and Y_modified_boundary are the dimensions of modified image boundary, wherein $16<=X\_modified\_boundary-X\_original<=$ and $16<=Y\_modified\_boundary-Y\_original<=$.

3. The medium of claim 1, wherein the target format is an MPEG format, the medium further comprising instructions that cause the distributed computer system to:
   perform a shape ratio conversion on the modulo 16 target format image so that the modulo 16 target format image displayed on the client device display resembles the image as it would appear when displayed on a personal computer monitor.

4. The medium of claim 1 further comprising instructions that cause the distributed computer system to:
   convert a style sheet into an element node tree; and
   transmit the element node tree to the client device.

5. The medium of claim 1, wherein the target format is an MPEG format, the medium further comprising instructions that cause the distributed computer system to:
   send service provider content from a head end to the server;
   display the modulo 16 target format image at a user at the client device and complete an e-commerce transaction between the service provider and the client device user.

6. A computer readable medium containing instructions that when executed by a distributed computer system cause the distributed computer system to:

receive content at a server from a service provider containing an original image;

extract markup language original image information from the content, the markup language original image information comprising original image size information;

pass the original image size information to a layout engine;

convert the original image to a target format to form a target format image and adding a pixel buffer to an x and y boundary dimension of the target format image, so that a target format image boundary x and y dimension is modulo 16 for layout on the client device display;

calculate the layout of the modulo 16 target format image on the client device display using the modulo 16 image boundary dimension instead of using the original image dimensions, wherein X original and Y original are the original image x and y dimensions X_modified_boundary and Y_modified_boundary are the dimensions of modified image boundary, wherein $16 <= X\_modified\_boundary - X\_original <=$ and $16 <= Y\_modified\_boundary - Y\_original <=$, position the original image in the lay out engine for display on a client device display to avoid overlapping content adjacent the image when displayed on the client device display;

send the positioned image to the client device for display to a user;

convert a style sheet into an element node tree; and transmit the element node tree to the client device.

7. The medium of claim 6 further comprising instructions that cause the distributed computer system to:

send the service provider content from a head end to the server; and complete an e-commerce transaction between the service provider and the client device user.

8. A method for formatting content for display in a distributed computer system comprising:

receiving content at a server from a service provider containing an original image;

extracting markup language original image information from the content, the markup language original image information comprising original image size information;

passing the original image size information to a layout engine, converting the original image to a target format to form target format image and adding a pixel buffer to an x and y boundary dimension of the target format image, so that a target format image boundary x and y dimension is modulo 16 for layout on the client device display;

calculating the layout of the modulo 16 target format image on the client device display using the modulo 16 image boundary dimension instead of using the original image dimensions, positioning the original image in the lay out engine for display on a client device display to avoid overlapping content adjacent the image when displayed on the client device display; and sending the positioned image to the client device for display to a user.

9. The method of claim 8, wherein the target format is an MPEG format, the method further comprising:

calculating the target format image boundaries wherein X original and Y_original are the original image x and y dimensions X_modified_boundary and Y_modified_boundary are the dimensions of modified image boundary, wherein $16 <= X\_modified\_boundary - X\_original <=$ and $16 <= Y\_modified\_boundary - Y\_original <=$.

10. The method of claim 8, wherein the target format is an MPEG format, the method further comprising:

performing a shape ratio conversion on the modulo 16 target format image so that the modulo 16 target format image displayed on the client device display resembles the image as it would appear when displayed on a personal computer monitor.

11. The method of claim 8 further comprising:

converting a style sheet into an element node tree; and transmitting the element node tree to the client device.

12. The method of claim 8, wherein the target format is an MPEG format, the method further comprising:

sending service provider content from a head end to the server;

displaying the modulo 16 target format image at a user at the client device; and completing an e-commerce transaction between the service provider and the client device user.

13. A method for formatting content for display in a distributed computer system comprising:

receiving content at a server from a service provider containing an original image;

extracting markup language original image information from the content, the markup language original image information comprising original image size information;

passing the original image size information to a layout engine;

converting the original image to a target format to form a target format image and adding a pixel buffer to an x and y boundary dimension of the target format image, so that a target format image boundary x and y dimension is modulo 16 for layout on the client device display;

calculating the layout of the modulo 16 target format image on the client device display using the modulo 16 image boundary dimension instead of using the original image dimensions, wherein X_original and Y_original are the original image x and y dimensions X_modified_boundary and Y_modified_boundary are the dimensions of modified image boundary wherein $16 <= X\_modified\_boundary - X\_original <=$ and $16 <= Y\_modified\_boundary - Y\_original <=$;

positioning the original image in the layout engine for display on a client device display to avoid overlapping content adjacent the image when displayed on the client device display;

sending the positioned image to the client device for display to a user;

converting a cascading style sheet into an element node tree; and transmitting the element node tree to the client device.

14. The method of claim 13 further comprising:

sending the service provider content from a head end to the server; and completing an ecommerce transaction between the service provider and the client device user.

* * * * *